A. J. LICHTIG

April 18, 1933. CLOTHES BAG Re. 18,799

2 Sheets-Sheet 1

Original Filed July 29, 1929

INVENTOR.
Abraham J. Lichtig
BY
Harry Schroeder
ATTORNEY

A. J. LICHTIG
April 18, 1933.
CLOTHES BAG
Re. 18,799
2 Sheets-Sheet 2
Original Filed July 29, 1929
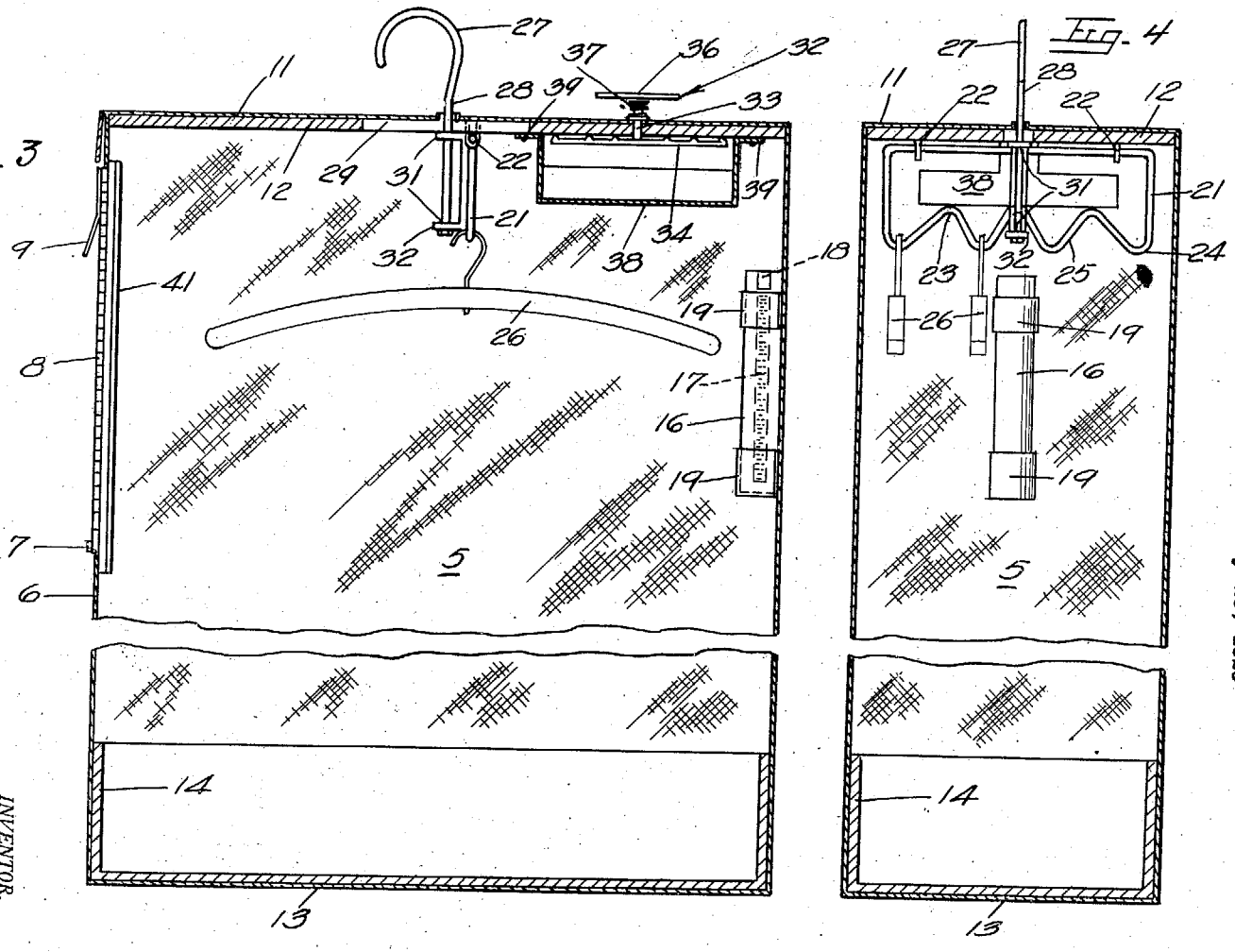
INVENTOR.
Abraham J. Lichtig
BY
Harry C. Schroeder
ATTORNEY Reissued Apr. 18, 1933

Re. 18,799

UNITED STATES PATENT OFFICE

ABRAHAM J. LICHTIG, OF OAKLAND, CALIFORNIA

CLOTHES BAG

Original No. 1,805,877, dated May 19, 1931, Serial No. 381,802, filed July 29, 1929. Application for reissue filed September 17, 1932. Serial No. 633,697.

The invention forming the subject matter of this application relates to clothes bags, and more particularly to a clothes bag that is moth proof.

An object is the provision of a clothes bag formed of flexible material and in which an aromatic fumigant material is embodied in the construction thereof so as to render the bag moth proof.

A second object of the invention is to provide a clothes bag with a suspending hook which is swiveled so that the bag may be turned to the most convenient position, for access to its interior, and which is hinged to the top of the bag so that it will lie down flat against said top when the bag is folded and packed for shipment.

Another object of the invention is the provision of a clothes bag constructed of flexible material and adapted to removably support a plurality of clothes hangers therein, there being a slotted opening in said bag for allowing access to the interior thereof, and wherein a separable fastening device is adapted to engage the edges of said opening and tightly close the same, means being also provided for suspending said bag.

A further object of the invention is the provision of a clothes bag of flexible material wherein the top of said bag is reinforced on the interior thereof with a rigid board formed of an aromatic fumigant material and the bottom of said bag carries a box constructed of the same material for containing small articles of clothing, the nature of said material being such as to render said bag moth proof, and in which a manually operated device is provided for scratching the surface of said material, thereby rendering the same more aromatic.

A still further object of the invention is the provision of a clothes bag of the character set forth, which is highly useful and simple in construction. Convenience of arrangement, lightness and comparative inexpense of manufacture are further objects which have been borne in mind in the production and development of the invention.

With the foregoing and other objects in view, which will be made manifest in the following detailed description of the preferred form of the device and specifically pointed out in the appended claims, reference is had to the accompanying drawings for the illustrative embodiment of the invention, wherein:

Fig. 3 is a longitudinal sectional view taken on the line 3—3 of Fig. 2.

Fig. 4 is a transverse sectional view taken on the line 4—4 of Fig. 2.

Figure 1:
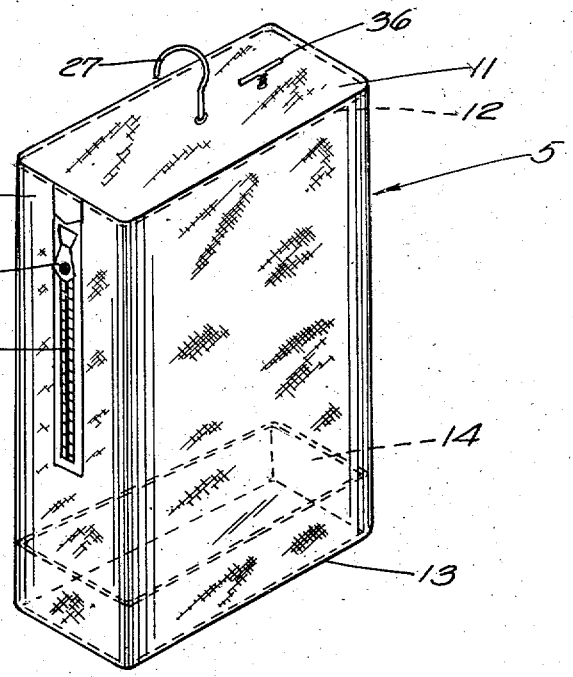
Fig. 1 is a perspective view of the clothes bag forming the invention.
Figure 2:
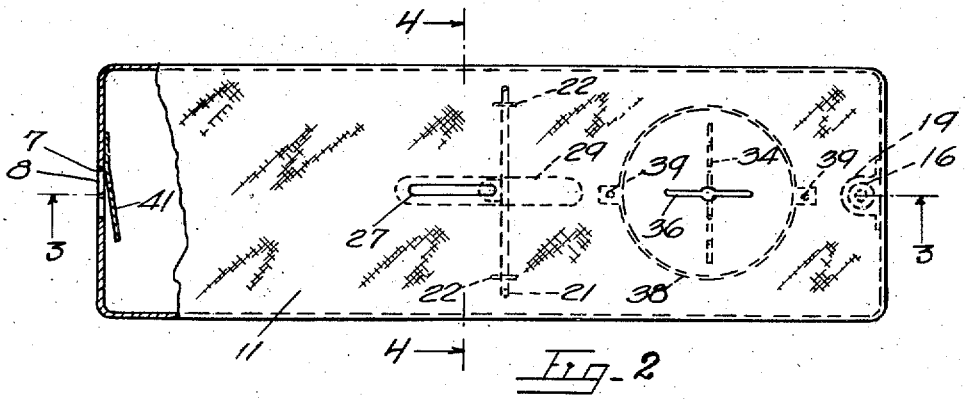
Fig. 2 is a top plan view in enlarged scale of the clothes bag shown in Fig. 1.

Referring to the accompanying drawings wherein similar reference characters designate similar parts throughout, the various figures described above adequately illustrate my invention, and the following detailed description is commensurate with the above mentioned drawings in enabling an artisan to construct and assemble the constituent parts of the same.

In carrying out my invention I make use of a clothes bag designated as an entirety by the reference numeral 5 and preferably constructed of a strong flexible fabric material, such as canvas or the like. The clothes bag 5 is rectangular in form, and a side 6 thereof is provided with a longitudinally extending slotted opening 7 for allowing access to the interior of said bag. Fastening means are provided for closing the opening 7, said means comprising the usual separable fastener arrangement which includes two rows of interlocking elements 8 secured to the opposite marginal edges of the opening. The interlocking elements 8 are controlled by a slide 9 which locks and unlocks the two rows of elements.

At the end 11 of the bag 5, which end will be hereinafter referred to as the top, there is provided a rectangular board 12 of a size equal to the size of said end. The board 12 is positioned on the inside of the bag 5 and fits against the inner surface of said bag forming a substantially rigid top. Positioned within the bag 5 and resting on the lower end 13 thereof is a rectangular clothes box 14 constructed of rigid material and open at the upper side thereof.

It is a feature of the invention that the board 12 and the box 14 are constructed of an aromatic fumigant material that will be particularly effective for rendering the bag moth proof. This objective may be attained by treating the board and box with an aromatic solution, or a preferable method, such as is shown in the drawings, may be employed. This method consists in constructing the board 12 and the box 14 of cedar wood which, as it is well known, is particularly effective as a protection against moths. As a further precaution in moth protection there is provided a small cedar wood vial 16 having a bore 17 which is filled with an aromatic liquid such as cedar oil. The bore 17 is closed by a small stopper 18 inserted in the open end thereof. The vial 16 is removably mounted in a socket arrangement indicated at 19 and positioned on a wall of the bag 5.

Means are provided for supporting a plurality of clothes hangers within the bag 5, said means preferably comprising a rectangular frame 21 constructed of a single length of wire bent into the desired rectangular shape. The upper longitudinal side of the wire frame 21 is hingedly secured, as at 22, to the under side of the top board 12 intermediate the ends thereof and is positioned so as to extend transversely thereacross. The lower longitudinal side of the wire frame 21 is corrugated, as at 25, so as to provide a plurality of successive ridges 23 and depressions 24. In this manner a plurality of hangers 26 may be supported in the bag 5 by engaging the hook portion of said hangers in the depressions 24 of the frame 21, as clearly illustrated in Fig. 4.

In order that the clothes bag 5 may be suspended in a closet or the like, there is provided a hook 27 having a shank 28 which extends through the top 11 of the bag 5 and through a longitudinal slot 29 formed in the top board 12. At the lower end thereof the shank 28 of the hook 27 is swivelly secured as at 31 to the wire frame 21, preferably by means of a U-shaped bracket 32, whose horizontally bent ends are bored to fit rotatably upon said shank 28, and whose vertical central portion is permanently fastened to said frame 21 in any suitable manner, as for example by being soldered to the upper and lower horizontal sides thereof.

The swiveled mounting of the hook 27 has a double function; it not only enables the bag to be turned, horizontally, while suspended from a fixed support, to a position enabling the most convenient access to its opening 7, but also, in cooperation with the slot 24 in the top 12 of the bag and with the hinge connection between the wire frame 21 and said top 12, it permits the hook 27 to be swung or folded down flat against said top when the bag is packed for storage or shipment, i. e., the wire frame 21 swings upwardly against the under side of the top 12, and the hook 27, having first been rotated in its swivel bearings 31 to a position at right angles to that shown in the drawings, swings downwardly and lies flat against the upper side of said top. This enables the bag to be packed in a shallower or thinner package than would be possible if the hook were rigidly mounted in the position shown, protects the hook from being bent or damaged during shipment, and protects the cloth cover of the bag from being scratched or torn by said hook. Furthermore, it enables two or more bags to be packed in one carton, if desired, without danger of the hook of one damaging the adjacent folded cloth of the other.

It is known that cedar wood in its natural state is extremely aromatic and gives off an odor that is particularly effective as a protection against moths. However, it has been found that the odor at times is not particularly strong. Experiment has proven that if the surface of the wood is broken or scratched the aromatic odor will be materially increased, and in this respect a manually operated device indicated by the numeral 32 has been provided for scratching a portion of the inside surface of the wood contained within the bag 5. The device 32 includes a shaft 33 which extends through an aperture in the board 12 and is provided on the inner end thereof with a fixed toothed bar 34, the teeth of which engage the inner surface of said board. At the outer end of the shaft 33 there is provided a handle 36 fixedly secured to said shaft. Between the handle 36 and the top of the board 12, and surrounding the shaft 33, is a coiled compression spring 37 which resiliently supports the toothed bar 34 in engagement with the board 12, causing the teeth of said bar to bite into the board. It will now be seen that manual rotation of the handle 36 will rotate the bar 34 causing the teeth thereon to scratch the surface of the board 12 for the purpose hereinbefore set forth. In order that the wood dust, caused by the scratching of the board surface, will not fall on the clothes contained in the bag 5, a receptacle 38 for catching said dust is provided. The receptacle 38 consists of a circular metal box secured to the inner surface of the board 12, directly under the scratching device 32, as at 39.

It will now be clearly seen that the clothes bag 5 may be readily suspended by the hook 27 in a closet and when it is desired to open the same it is merely necessary to move the slide 9 to disengage the interlocking elements 8 which unfastens the opening 7 and allows access to the interior of the bag. Clothes such as suits, dresses, coats and such articles, may be hung on the hangers 26 while small articles of clothing, such as furs, may be placed in the cedar box 14. 41 indicates a flap which is secured to the bag 5 longitudinally of the opening 7 and extends across said opening covering the interlocking elements 8 for preventing clothing from becoming caught in said elements.

From the foregoing, it is thought that the construction, use and many advantages of the herein described clothes bag will be readily understood without further description, and it will also be understood that changes in the form, proportion and minor details of construction may be resorted to without departing from the spirit of the invention or sacrificing any of the advantages thereof.

What I claim is:

1. A clothes bag comprising a top; a rigid spreader frame therefor; flexible walls suspended therefrom; a hanger frame hinged to said spreader frame within the bag for swinging movement in a vertical plane; and a suspending hook swiveled to said hanger frame for rotary movement in a horizontal plane, the swinging of said hanger frame moving both it and said hook from their normal vertical positions to positions approximately parallel to the top of the bag.

2. A clothes bag comprising a top; a rigid spreader frame therefor; flexible walls suspended therefrom; a hanger frame hinged to said spreader frame within the bag for swinging movement in a vertical plane, said hanger frame having spaced upper and lower horizontal members; and a suspending hook having a stem portion connected with both said horizontal members for rotary movement in a horizontal plane, the swinging of said hanger frame moving both it and said hook from their normal vertical positions to positions approximately parallel to the top of the bag.

3. A clothes bag comprising a top; a rigid spreader frame therefor; flexible walls suspended therefrom; a hanger frame hinged to said spreader frame within the bag for swinging movement in a vertical plane, said hanger frame having spaced upper and lower horizontal members; a reinforcing member extending across and connecting said horizontal members; and a suspending hook swiveled to said reinforcing member for rotary movement in a horizontal plane, the swinging of said hanger frame moving both it and said hook from their normal vertical positions to positions approximately parallel to the top of the bag.

In testimony whereof I have affixed my signature.

ABRAHAM J. LICHTIG.